Jan. 9, 1962     E. J. WELLER     3,016,079

TRACTION DEVICE

Filed Jan. 8, 1960     3 Sheets-Sheet 1

INVENTOR
Eli J. Weller

Jan. 9, 1962  E. J. WELLER  3,016,079
TRACTION DEVICE
Filed Jan. 8, 1960  3 Sheets-Sheet 2
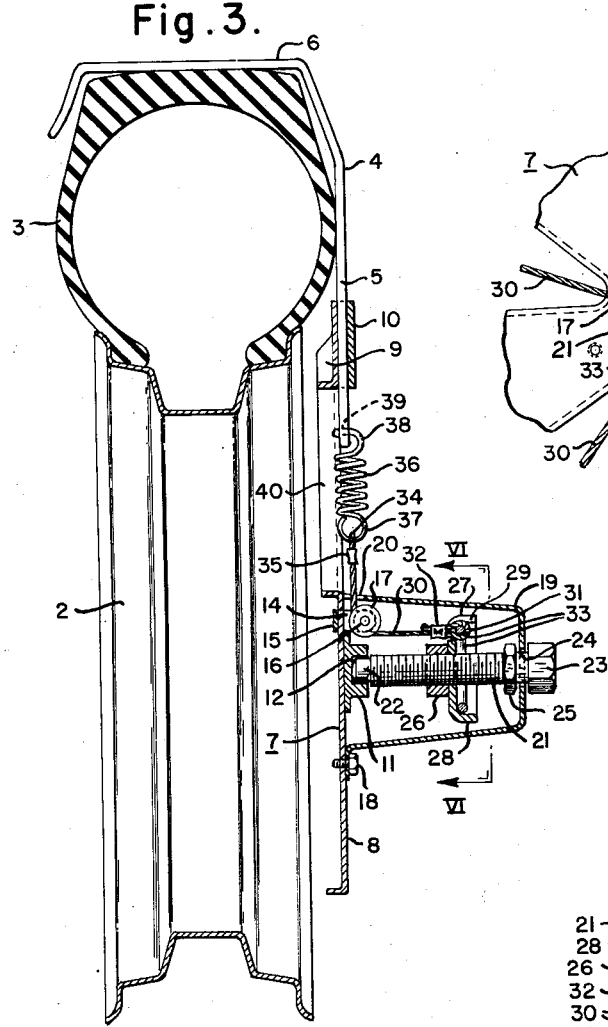
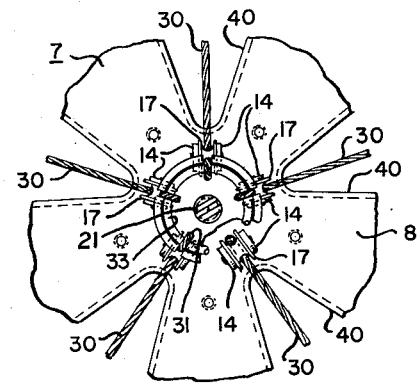
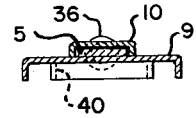
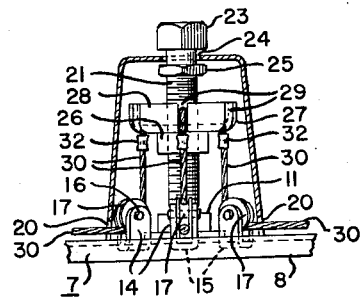
INVENTOR
Eli J. Weller Jan. 9, 1962   E. J. WELLER   3,016,079
TRACTION DEVICE
Filed Jan. 8, 1960   3 Sheets-Sheet 3

INVENTOR
Eli J. Weller
his attorneys

3,016,079
TRACTION DEVICE
Eli J. Weller, 3747 Main St., Weirton, W. Va.
Filed Jan. 8, 1960, Ser. No. 1,840
10 Claims. (Cl. 152—218)

This invention relates to a traction device, particularly a traction device adapted for application to vehicle wheels to afford added traction on ice and in snow and mud. This application is in part a continuation of my copending application Serial No. 815,054, filed May 22, 1959 and now abandoned.

For purposes of explanation and illustration I shall describe the invention as embodied in a traction device adapted for application to pneumatic-tired automobile wheels although in its broader aspects my invention is not so limited. Many attempts have been made to improve upon the so-called automobile tire chain which has been the standard traction device for automobile wheels virtually since the invention of the automobile. The disadvantages of tire chains have long been recognized: they are difficult to apply and remove; they quickly wear out so that links have to be replaced; the replacement of the links is a difficult chore; and tire chains have a tendency to strike against the fenders of the automobile creating a disturbing noise. It has heretofore been proposed to provide traction devices employing a plurality of generally hook-like members adapted to be hooked over the vehicle wheel, or, in the case of pneumatic-tired vehicle wheels, to be hooked over the tire, with means for maintaining the generally hook-like members in operative position during operation of the vehicle. However, the problem has been a vexing one and so far as I am aware no practicable means for maintaining the generally hook-like members in proper relation to the wheel or tire while allowing radial movement thereof due to compression of the tire against the road surface during operation of the vehicle and also providing for easy application and removal of the traction device have heretofore been devised although numerous patents have been issued on such devices.

I have solved the previously existing problems and provide a traction device which is practical, virtually foolproof in operation, of long life, inexpensive to manufacture and easy to apply and remove. I also provide novel means of especial utility for adjusting the tension exerted on the generally hook-like members which are hooked over the wheel or tire.

I provide a traction device comprising a plurality of generally hook-like members adapted to be hooked over a vehicle tire, each such member having a shank adapted to be disposed in generally radial position alongside the wheel carrying the tire, a hub member adapted to be disposed alongside the wheel in substantially coaxial relation thereto, the hub member having guideways receiving said shanks, tightening means connected with the hub member and having a portion movable generally axially thereof, connections between the tightening means and said shanks and means for operating the tightening means to move said portion generally axially of the hub member to tighten the generally hook-like members about the tire. Preferably the shanks of the generally hook-like members extend through the guideways of the hub member and the connections between the tightening means and the shanks include resilient means, such, for example, as coil springs acting in tension. Desirably the hub member has openings therein adjacent the ends of the shanks of the generally hook-like members and the connections between the tightening means and said shanks include springs disposed in those openings. This provision allows the springs to act freely without binding against the hub member.

I further provide a traction device comprising a plurality of generally hook-like members adapted to be hooked over a vehicle tire, each such member having a shank adapted to be disposed in generally radial position alongside the wheel carrying the tire, a tightening element disposed generally axially of the wheel, connections between the tightening element and said shanks and means for moving the tightening element generally axially of the wheel to tighten the generally hook-like members about the tire. I preferably provide screw means disposed generally axially of the wheel for moving the tightening element to draw tight the connections between the tightening element and the shanks and tighten the generally hook-like members about the tire. The tightening element is preferably internally threaded and a screw is preferably threaded through the tightening element, disposed generally axially of the wheel and mounted for turning movement relatively to the tightening element to move the tightening element generally axially of the wheel to draw tight the connections between the tightening element and the shanks and tighten the generally hook-like members about the tire. I preferably provide screw means mounted for turning movement in the hub and cooperating with the tightening element to move the tightening element generally axially of the wheel.

In a preferred form of my traction device I provide guide means together with flexible elements respectively connected with the shanks of the generally hook-like members and extending about the guide means and each connected with the tightening element so that when the tightening element moves generally axially of the wheel it tightens the generally hook-like members generally radially and means for moving the tightening element generally axially of the wheel.

Other details, objects and advantages of the invention will become apparent as the following description of certain present preferred embodiments thereof proceeds.

In the accompanying drawings I have shown certain present preferred embodiments of the invention in which FIGURE 1 is a side elevational view of an automobile wheel equipped with a pneumatic tire and with my traction device applied thereto;

FIGURE 3 is a fragmentary cross-sectional view to enlarged scale taken on the line III—III of FIGURE 1;

FIGURE 6 is a fragmentary cross-sectional view taken on the line VI—VI of FIGURE 3 but with a portion of the structure omitted;

FIGURE 7 is a view partly in cross section and partly in elevation of a portion of my traction device illustrating particularly the screw means mounted for turning movement in the hub threaded through the tightening element which is connected with the shanks of the generally hook-like member by flexible connecting elements;

FIGURE 8 is a fragmentary cross-sectional view taken on the line VIII—VIII of FIGURE 1;

Figure 1:
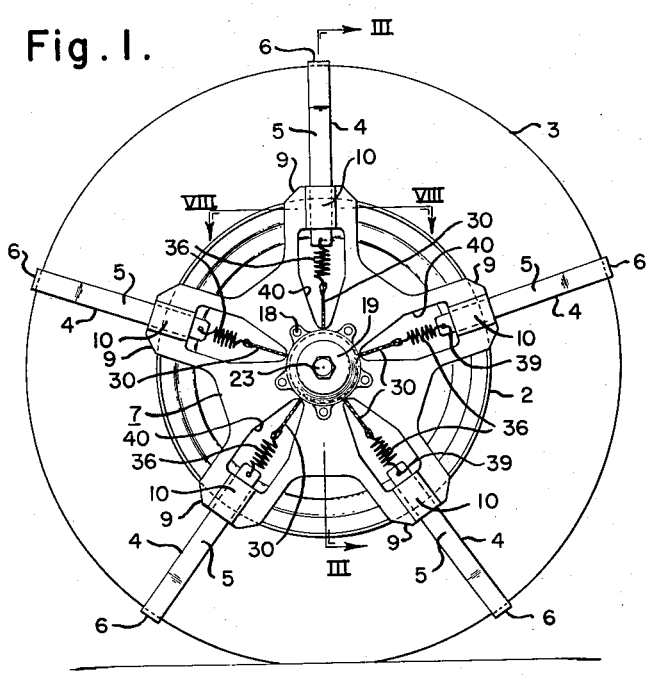

Referring now more particularly to the drawings, there is shown diagrammatically a steel automobile wheel designated generally by reference numeral 2 which may be of conventional construction adapted to receive a tubeless pneumatic tire. A tubeless pneumatic tire designated generally by reference numeral 3 is shown as applied to the wheel 2, the showing being purely diagrammatic. The wheel is of course adapted for application to an axle of an automobile in conventional manner. The automobile wheel 2 and tire 3 may be of conventional or other construction and do not per se constitute my invention.

Figure 4:
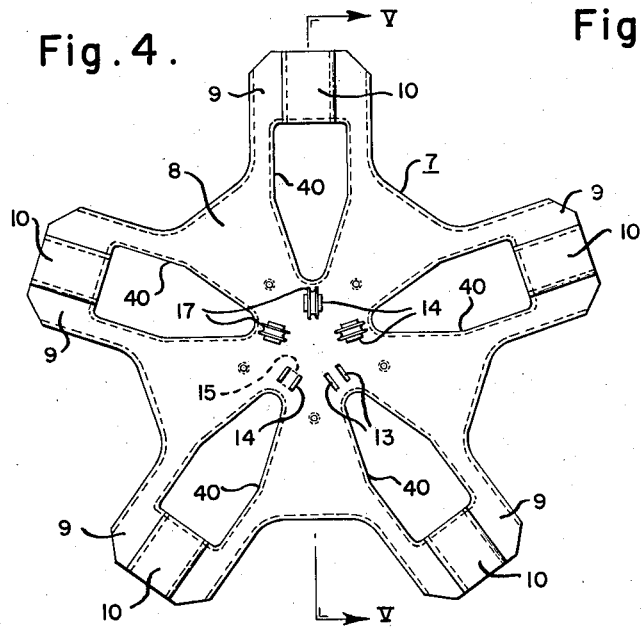
FIGURE 4 is a face view of the hub member of my traction device.

My traction device comprises a plurality of generally hook-like member each designated generally by reference numeral 4 adapted to be hooked over the tire 3 as shown, each such member having a shank 5 adapted to be disposed in generally radial position alongside the wheel 2 when the traction device is applied. Each generally hook-like member 4 has a tread portion 6 adapted to engage the road surface, which tread portion may be formed in any appropriate manner with antiskid ribs, or it may have antiskid devices applied to it. When my traction device is applied to the pneumatic-tired wheel the shanks 5 of the generally hook-like members 4 are disposed at the outside of the wheel. Also disposed at the outside of the wheel and normally in substantially coaxial relation thereto is a hub member designated generally by reference numeral 7 and which may for example be a steel stamping. One form of hub member is shown in detail in FIGURES 4 and 5. It comprises a body 8 having radially outward projections 9 each provided at its outer portion with a guideway 10 for guiding for generally radial back and forth movement during operation of the vehicle of the shank 5 of one of the generally hook-like members 4. Thus when my traction device is applied the generally hook-like members are hooked over the tire as shown at the upper portion of FIGURE 3 and the shank 5 of each of the generally hook-like members extends through and is guided by one of the guideways 10 of the hub member 7. The guideways 10 are shaped to snugly but guidingly receive the shanks 5 so as to maintain the generally hook-like members in substantially radial position but allow for radial movement thereof due to compression of the tire against the road surface during operation of the vehicle.

Applied to the hub member 7 at the center thereof, as, for example, by being welded thereto, is a bearing member 11 having a bearing cavity 12 for a purpose presently to be described. Surrounding the bearing member 11 are pairs of parallel slots 13, there being as many such pairs of slots as there are radially outward projections 9 of the hub member 7. Five such projections are shown providing five guideways 10 so in the particular embodiment of my invention shown in the drawings five generally hook-like members 4 are adapted to be employed. A pair of slots 13 are provided in line with each guideway 10 as clearly shown in FIGURE 4. A U-shaped bracket 14 is applied to each of the pairs of slots 13 with the cross member or base 15 of the bracket disposed at the inside of the hub member and with the arms of the bracket projecting outwardly through the slots and carrying a cross pin 16 serving to journal a grooved guide roller or sheave 17. Thus there are five such grooved guide rollers 17, one in line with each guideway 10. The brackets 14 may be welded in place on the hub member 7.

Forming a part of the hub member 7 and fastened to the body 8 thereof in any suitable manner, as, for example, by screws 18, is a central generally cup-shaped member 19 which covers the five guide rollers 17. The member 19 has therethrough an opening 20 in line between each guideway 10 and the bottom periphery of the corresponding guide roller 17.

A screw 21 is mounted for turning movement in the hub member 7 which includes the number 19 applied to the body of the hub member. The shank end 22 of the screw is journaled in the bearing cavity 12 of bearing member 11 as clearly shown in FIGURE 3. The screw has a head 23 by which it is adapted to be turned and is journaled adjacent the head in an opening 24 in the member 19, the screw head being disposed outside the member 19 to enable the screw to be turned by application of a wrench or other suitable tool. A nut 25 is applied to the screw inside the member 19 to insure maintaining the screw in place.

Threadedly applied to the screw 21 is a travelling nut 26 which may form a part of a tightening element designated generally by reference numeral 27. The tightening element 27 has a peripheral flange 28 extending generally away from the body of the hub member so that the tightening element is of generally cup shape. Indeed the tightening element may be formed by welding a generally cup shaped member to a conventional nut 26. The flange 28 has therein five slots 29. A flexible connecting element 30 connects each shank 5 with the tightening element. At its inner end (its end nearer the axis) each flexible element 30 has an eye 31 formed thereon by reversely turning the end of the flexible element and fastening it down by a band 32. The inner end of each flexible connecting element 30 passes through one of the slots 29 and a ring 33 passes through the eyes 31. The ring 33 cooperates with the bands 32 to fasten the ends of the flexible connecting elements 30 to the tightening element.

The flexible connecting elements 30 pass about the guide rollers or sheaves 17 as shown which act in the nature of pulleys and the outer end (the end relatively remote from the axis) of each of the flexible connecting elements has an eye 34 formed thereon by a band 35 in a manner similar to the manner in which the eyes 31 are formed. A tension coil spring 36 connects each eye 34 with one of the shanks 5, each spring having an end portion 37 passing through the eye and an end portion 38 passing through a bore 39 in the shank 5. Five openings 40 are formed in the hub member 7, each being in line between one of the guideways 10 and the corresponding guide roller 17. Each spring 36 is disposed in one of the openings 40 so that it will act freely without binding against the hub member (see FIGURE 3).

Figure 2:
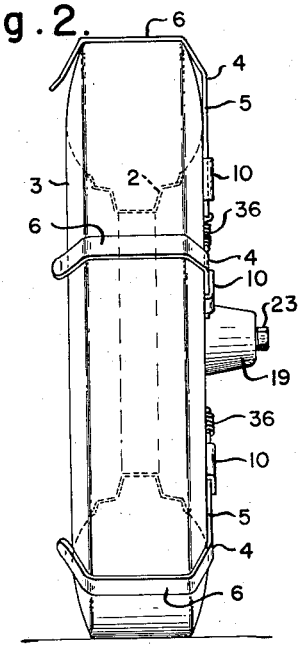
FIGURE 2 is a view of the assembly shown in FIGURE 1 as viewed from the left hand side of FIGURE 1.

In applying my traction device one of the generally hook-like members 4 is hooked over the top of the tire and its shank 5 is inserted through one of the guideways 10 of the hub member 7 and connected with the corresponding flexible connecting element 30 by a spring 36. Successively the other generally hook-like members 4 are applied in the general relationship shown in FIGURES 1 and 2 until all have been applied and connected with the tightening element 27 as above explained. When all of the generally hook-like members 4 have been thus applied and connected with the tightening element a wrench or other suitable tool is applied to the head 23 of the screw 21 which is turned to apply a desired degree of tension to the flexible connecting elements 30 and springs 36 so that the traction device will operate properly under the conditions imposed.

Figure 5:
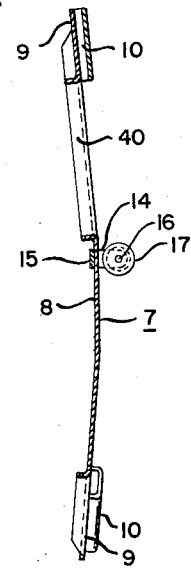
FIGURE 5 is a cross-sectional view taken on the line V—V of FIGURE 4.

FIGURE 5 shows the hub member 7 somewhat dished convexly outwardly, but when the parts are assembled and tension is applied to the flexible connecting elements 30 the hub member will tend to straighten out generally into a plane as indicated in FIGURE 3.

To remove my traction device the spring tension is relieved by turning the screw 21 to move the tightening element 27 toward the wheel and the springs 36 are unhooked from the respective shanks 5 of the generally hook-like members 4 permitting the generally hook-like members 4 to be withdrawn from the guideways 10. It may be possible in some instances to remove the traction device by turning the screw 21 so that the tightening element 27 moves down very close to the bearing member 11 when by stretching the springs 36 it may be possible to unhook the members 4 from the tire without disconnecting the springs from the shanks. However, I contemplate that normally in removing the traction device the respective springs 36 will be disconnected from the corresponding shanks 5.

Thus my traction device is of simple and rugged construction, of low cost, easy to apply and remove and readily adjustable as to the tension applied to the generally hook-like members. The shanks of the generally hook-like members are guided by the guideways provided in the hub member and radial tension is applied to the generally hook-like members by axial movement of the tightening element. The means for operating the tightening element are readily accessible and may be operated simply by applying a wrench to the head 23 of the screw 21.

Figure 10:
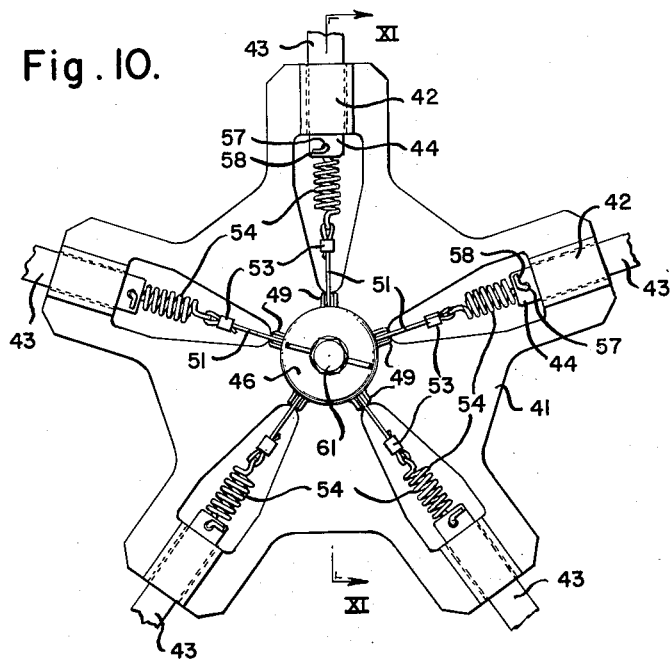
FIGURE 10 is a fragmentary face view of a portion of a traction device incorporating the structure shown in FIGURE 9.
Figure 11:
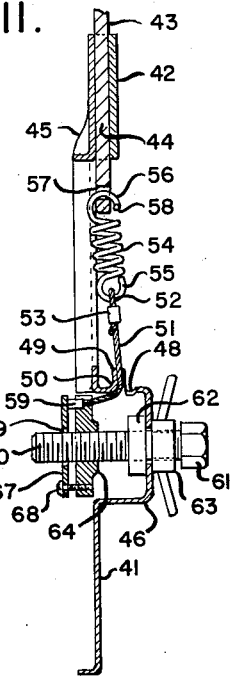
FIGURE 11 is an enlarged fragmentary cross-sectional view taken on the line XI—XI of FIGURE 10.
Figure 9:
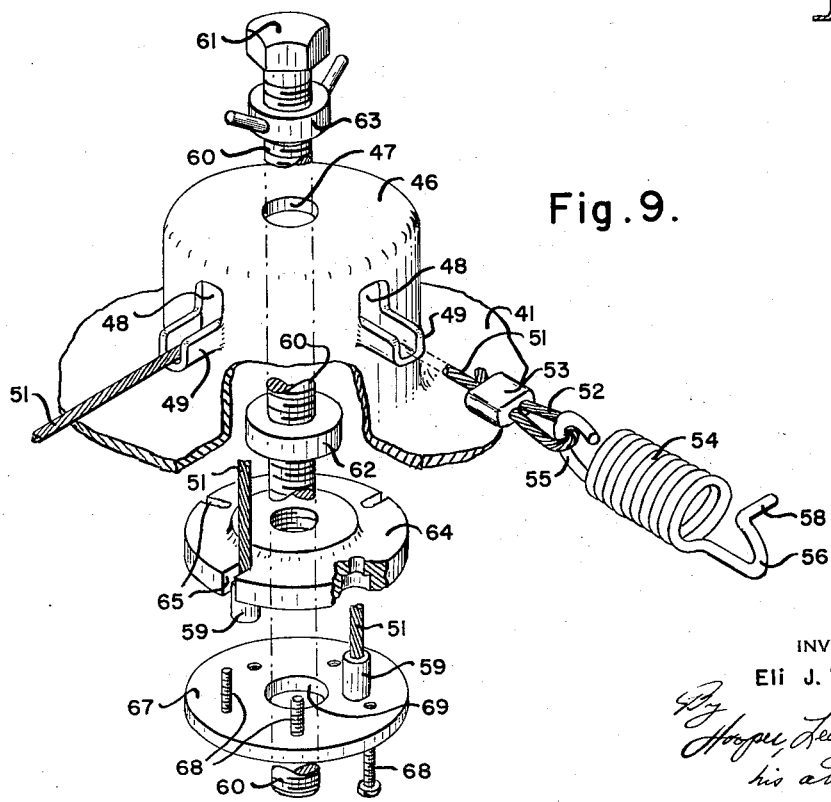
FIGURE 9 is a fragmentary perspective view with parts in exploded relationship of a portion of a modified form of traction device.

Referring to FIGURES 9, 10 and 11, there is shown a modified form of traction device having a hub member 41 of generally the same shape as the hub member 7 above described having guideways 42 analogous to the guideways 10 and similarly positioned. Five hook-like members 43 are provided which may be identical with the hook-like members 4. Each of the hook-like members 43 has a shank 44 which passes through and is guided by one of the guideways 42. The hub 41 in the region of the portion of the side wall of the tire remote from the tread is smoothly curved as shown at 45 to minimize chafing of such portion of the side wall of the tire in the event of contact therewith of said portion of the hub.

The hub 41 has a central dome 46 which may be an integral part of the hub drawn or otherwise formed unitarily therewith or may be separately formed and welded or otherwise applied thereto. The dome 46 has an axial circular opening 47 therethrough. The dome 46 also has lateral openings 48 through the side wall thereof with the material of the dome shaped at said openings as shown at 49 by drawing or otherwise to guide elongated flexible elements presently to be described in their operative paths between the hook-like members 43 and tightening means presently to be described. The elongated flexible elements pass through the openings 48 and are guided by the material 49 of the dome at said openings. As shown in FIGURES 9, 10 and 11 the material of the dome at each of the portions 49 is formed somewhat as a trough with smooth curves connecting the sides of the trough to the bottom thereof. Also the material is smoothly curved at 50 (FIGURE 11) where the guiding portion joins the generally cylindrical wall of the dome.

There are five elongated flexible elements shown as wire cables 51 each having a loop 52 formed at its radially outer end by a clamp 53 of any suitable construction. I provide coil springs 54 each having a curved extremity 55 hooked into one of the loops 52 as clearly shown in FIGURE 9, the extremity 55 being bent so that it virtually touches the cylindrical portion of the spring and thus obviates any possibility of disengagement from the loop 52. At its opposite end each spring 54 has a curved terminal portion 56 for hooking into an eye 57 of the shank 44 of the corresponding generally hook-like member 43 and a projection 58 at the extremity of the curved terminal portion 56 to obviate unhooking of such portion of the spring from the shank of the hook-like member when the hook-like member moves generally toward the axis of the wheel due to compression of the tire against the surface on which the vehicle is traveling. Particularly at high speeds there may at times be a momentary slack in the cables 51; the projections 58 on the springs insure that the springs will not become unhooked from the eyes 57 of the generally hook-like members 43 under any conditions encountered in use.

The ends of the cables 51 remote from the springs 54 have enlargements 59 at their extremities. The enlargements 59 may be in the form of hollow cylindrical metal members as shown in FIGURES 9, 10 and 11. The end of each cable 51 may be inserted into and soldered, brazed or welded to the corresponding member 59.

Extending through the opening 47 is a screw 60. The head 61 of the screw 60 is disposed outside the dome 46. A stop collar 62 is pinned or otherwise securely fastened in fixed position to the screw 60 and is adapted to abut the inside of the top of the dome 46 as shown in FIGURE 11 and to cooperate with a nut 63 threaded onto the screw 60 outside the dome. When the screw 63 is turned up tightly against the dome as shown in FIGURE 11 the screw is not only maintained in coaxial position in the dome but is locked against turning. If the nut 63 is backed off slightly toward the right viewing FIGURE 11 the grip upon the top of the dome between it and the collar 62 is released sufficiently to permit the screw 60 to be turned but the screw is still substantially maintained in position coaxially of the dome by the cooperation of the collar 62 and the screw 60 with the top of the dome. The screw extends inwardly substantially coaxially with the wheel upon which the tire is mounted. Threaded onto the screw 60 is a nut 64 having slots 65 extending inwardly from the edge thereof. Each of the cables 51 extends through one of the openings 48, being guided by the material of the dome at the opening as above described, and is connected with the nut 64 by insertion into one of the slots 65 with the enlargement 59 thereof bearing against the face of the nut 65 remote from the head 61 of the screw 60. The enlargements 59 bear against the nut 64 and resist the effort of the springs 54 to pull the cables 51 outwardly. A holding member 67 is provided which engages the extremities of the cables 51 having the enlargements 59 applied thereto and presses the enlargements against the nut 64 to inhibit disengagement of the cables from the nut 64. Screws 68 fasten the holding member 67 to the nut 64. The holding member 67 has a circular central opening 69 therethrough through which the screw 60 freely passes.

The openings 48 are so disposed in the dome 46 that the springs 54 and the cables 51 extend from the shanks 44 of the generally hook-like members 43 generally radially inwardly and also somewhat axially outwardly toward the dome as shown in FIGURE 11 to obviate a tendency for the radially inward ends of the shanks 44 to move somewhat axially toward the wheel carrying the tire when the generally hook-like members move generally toward the axis of the wheel due to compression of the tire against the surface on which the vehicle is traveling.

The structure of FIGURES 9–11 is applied and operates similarly to the structure of FIGURES 1–8. A difference in operation between the structure of FIGURES 1–8 and that of FIGURES 9–11 is that in the structure of FIGURES 9–11 the traction device is tightened on the tire by movement of the nut 64 inwardly or toward the wheel whereas in the structure of FIGURES 1–8 the opposite is true. The structure of FIGURES 9–11 does not project outwardly away from the wheel as far as the structure of FIGURES 1–8 and for that reason is preferred for certain uses.

While I have shown and described certain present preferred embodiments of the invention, it is to be distinctly understood that the invention is not limited thereto but may be otherwise variously embodied within the scope of the following claims.

I claim:

1. A traction device comprising a plurality of generally hook-like members adapted to be hooked over a vehicle tire, each such member having a shank adapted to be disposed in generally radial position alongside the wheel carrying the tire, a hub member adapted to be disposed alongside the wheel in substantially coaxial relation thereto, the hub member having guideways through which the shanks pass and having openings extending therethrough in a direction parallel to the axis of the hub member adjacent the ends of the shanks, tightening means connected with the hub member and extending generally axially thereof, connections between the tightening means and said shanks, said connections including springs disposed in said openings, and means for operating the tightening means to tighten the generally hook-like members about the tire.

2. A traction device comprising a plurality of generally hook-like members adapted to be hooked over a vehicle tire, each such member having a shank adapted to be disposed in generally radial position alongside the wheel carrying the tire, a spring connected with each shank, a tightening element disposed generally axially of thee wheel, guide means, flexible elements respectively connected with said springs and extending generally radially therefrom and then about said guide means and then generally axially and each connected with the tightening element so that when the tightening element moves generally axially of the wheel it tightens the generally hook-like members generally radially and means for moving the tightening element generally axially of the wheel.

3. A traction device comprising a plurality of generally hook-like members adapted to be hooked over a vehicle tire, each such member having a shank adapted to be disposed in generally radial position alongside the wheel carrying the tire, a hub member adapted to be disposed alongside the wheel in substantially coaxial relation thereto, the hub member having guideways receiving said shanks, the shanks extending through the guideways and extending radially inwardly from the inner extremities of the guideways, the shanks being readily removable from the guideways by being drawn outwardly relatively thereto, a tightening element carried by the hub member disposed generally axially of the wheel, guide means, flexible elements respectively connected with said shanks at portions of the shanks disposed inwardly of the guideways and extending generally radially therefrom and then about said guide means and then generally axially and each connected with the tightening element so that when the tightening element moves generally axially of the wheel it tightens the hook-like members generally radially and means for moving the tightening element generally axially of the wheel.

4. A traction device comprising a plurality of generally hook-like members adapted to be hooked over a vehicle tire, a hub member adapted to be disposed alongside the wheel carrying the tire, tightening means connected with the hub member and connections between the tightening means and the generally hook-like members to draw the generally hook-like members generally inwardly about the tire upon operation of the tightening means, the tightening means including a screw and a nut threaded onto the screw and connections between the nut and generally hook-like members, the screw passing through an opening in the hub member and having collars thereon at opposite sides of the hub member at said opening to prevent substantial axial movement of the screw relatively to the hub member, at least one of said collars being movable somewhat away from the other to provide for turning of the screw relatively to the hub member and being movable toward the other to clamp the screw to the hub member in non-rotative relationship thereto.

5. A traction device comprising a plurality of generally hook-like members adapted to be hooked over a vehicle tire, each such member having a shank adapted to be disposed in generally radial position alongside the wheel carrying the tire, a spring connected with each shank, a tightening element disposed generally in line with the axis of the tire, means extending between the springs and the tightening element effective upon operation of the tightening element to tighten the generally hook-like members generally radially and means for operating the tightening element.

6. A traction device comprising a plurality of generally hook-like members adapted to be hooked over a vehicle tire, each such member having a shank adapted to be disposed in generally radial position alongside the wheel carrying the tire, a spring connected with each shank, a tightening element disposed generally axially of the wheel, means extending between the springs and the tightening element effective upon movement of the tightening element generally axially of the wheel to tighten the generally hook-like members generally radially and means for moving the tightening element generally axially of the wheel.

7. A traction device comprising a plurality of generally hook-like members adapted to be hooked over a vehicle tire, each such member having a shank adapted to be disposed in generally radial position alongside the wheel carrying the tire, a hub member adapted to be disposed alongside the wheel in substantially coaxial relation thereto, the hub member having guideways receiving the shanks, the shanks extending through the guideways and extending radially inwardly from the inner extremities of the guideways, the shanks being readily removable from the guideways by being drawn outwardly relatively thereto, a tightening element disposed generally in line with the axis of the tire, means extending between the shanks and the tightening element effective upon operation of the tightening element to tighten the generally hook-like members generally radially and means for operating the tightening element.

8. A traction device comprising a plurality of generally hook-like members adapted to be hooked over a vehicle tire, each such member having a shank adapted to be disposed in generally radial position alongside the wheel carrying the tire, a hub member adapted to be disposed alongside the wheel in substantially coaxial relation thereto, the hub member having guideways receiving the shanks, the shanks and guideways being shaped so that the guideways prevent turning of the shanks in the guideways, a tightening element disposed generally in line with the axis of the tire, means extending between the shanks and the tightening element effective upon operation of the tightening element to tighten the generally hook-like members generally radially and means for operating the tightening element.

9. A traction device comprising five substantially equally spaced generally hook-like members adapted to be hooked over a vehicle tire, each such member having a shank adapted to be disposed in generally radial position alongside the wheel carrying the tire, a tightening element disposed generally in line with the axis of the tire, means extending between the shanks and the tightening element effective upon operation of the tightening element to tighten the generally hook-like members generally radially and means for operating the tightening element.

10. A traction device comprising five generally hook-like members adapted to be hooked over a vehicle tire, each such member having a shank adapted to be disposed in generally radial position alongside the wheel carrying the tire, a hub member adapted to be disposed alongside the wheel in substantially coaxial relation thereto, the hub member having guideways receiving the shanks, the shanks and guideways being shaped so that the guideways prevent turning of the shanks in the guideways, the shanks extending through the guideways and extending radially inwardly from the inner extremities of the guideways, the shanks being readily removable from the guideways by being drawn outwardly relatively thereto, a spring connected with each shank, a tightening element disposed generally axially of the wheel, means extending between the springs and the tightening element effective upon movement of the tightening element generally axially of the wheel to tighten the generally hooklike members generally radially and means for moving the tightening element generally axially of the wheel.

References Cited in the file of this patent

UNITED STATES PATENTS

| | | |
|---|---|---|
| 2,423,759 | Edwards | July 8, 1947 |
| 2,477,051 | Eisenhauer | July 26, 1949 |
| 2,729,261 | Rucker | Jan. 3, 1956 |
| 2,767,761 | O'Higgins | Oct. 23, 1956 |
| 2,837,133 | Armenante et al. | June 3, 1958 |

UNITED STATES PATENT OFFICE
CERTIFICATE OF CORRECTION

Patent No. 3,016,079                          January 9, 1962

Eli J. Weller

It is hereby certified that error appears in the above numbered patent requiring correction and that the said Letters Patent should read as corrected below.

Column 3, line 24, for "member" read -- members --; column 4, line 36, after "the", second occurrence, insert -- inner --; column 7, line 24, for "thee" read -- the --; line 63, after "and", second occurrence, insert -- the --.

Signed and sealed this 29th day of May 1962.

(SEAL)
Attest:

ERNEST W. SWIDER
Attesting Officer

DAVID L. LADD
Commissioner of Patents